US012620869B2

(12) United States Patent
Jayaraman et al.

(10) Patent No.: US 12,620,869 B2
(45) Date of Patent: May 5, 2026

(54) STATOR OF AN ELECTRIC GENERATOR HAVING A REINFORCEMENT STRUCTURE

(71) Applicant: Siemens Gamesa Renewable Energy A/S, Brande (DK)

(72) Inventors: Saravanan Jayaraman, Ikast (DK); Simon Vyff Jensen, Tørring (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 530 days.

(21) Appl. No.: 17/882,933

(22) Filed: Aug. 8, 2022

(65) Prior Publication Data

US 2023/0053041 A1     Feb. 16, 2023

(30) Foreign Application Priority Data

Aug. 13, 2021     (EP) ..................................... 21191230

(51) Int. Cl.
| | |
|---|---|
| *H02K 5/20* | (2006.01) |
| *H02K 1/14* | (2006.01) |
| *H02K 1/20* | (2006.01) |
| *H02K 5/04* | (2006.01) |
| *H02K 7/18* | (2006.01) |

(52) U.S. Cl.
CPC ........... *H02K 7/1838* (2013.01); *H02K 1/148* (2013.01); *H02K 1/20* (2013.01); *H02K 5/04* (2013.01); *H02K 5/207* (2021.01); *H02K 2213/03* (2013.01)

(58) Field of Classification Search
CPC .............................. H02K 7/1838; H02K 5/207
USPC ......................................................... 310/179
See application file for complete search history.

(56) References Cited

U.S. PATENT DOCUMENTS

| | | | | |
|---|---|---|---|---|
| 6,762,525 | B1 * | 7/2004 | Maslov ................ | H02K 1/2791 |
| | | | | 310/216.023 |
| 8,492,951 | B2 * | 7/2013 | Zirin ...................... | H02K 1/185 |
| | | | | 310/216.098 |
| 10,819,170 | B2 * | 10/2020 | Messner ................ | F03D 80/60 |
| 10,886,797 | B2 * | 1/2021 | Andersen ............... | H02K 7/183 |
| 12,176,758 | B2 * | 12/2024 | Munk-Hansen ..... | H02K 7/1838 |
| 2010/0102656 | A1 | 4/2010 | Booth | |
| 2011/0266913 | A1 | 11/2011 | Zirin et al. | |

(Continued)

FOREIGN PATENT DOCUMENTS

| | | | | |
|---|---|---|---|---|
| DE | 102017206873 | A1 * | 10/2018 | ............... H02K 1/20 |
| EP | 3352334 | A1 | 7/2018 | |
| EP | 3595147 | A1 | 1/2020 | |

OTHER PUBLICATIONS

European Search Report issued on Jan. 28, 2022 for application No. 21191230.8.

*Primary Examiner* — Alexander Talpalatski
(74) *Attorney, Agent, or Firm* — Schmeiser, Olsen & Watts LLP

(57) ABSTRACT

A stator for a wind turbine generator is provided, the stator including a first end plate and a second end plate spaced apart from each other in an axial direction of the wind turbine generator, and a reinforcement structure shaped as a plate and arranged between, and fixed to the first end plate and the second end plate, wherein the reinforcement structure is configured for coupling the first end plate and the second end plate, such that a force is transmissible between the first end plate and the second end plate.

14 Claims, 6 Drawing Sheets

(56)         References Cited

U.S. PATENT DOCUMENTS

2013/0241365 A1* 9/2013 Booth ...................... H02K 1/28
                                                     310/400
2019/0334394 A1   10/2019 Messner
2019/0363591 A1* 11/2019 Jöckel .................... H02K 1/187
2020/0136442 A1*  4/2020 Andersen .............. H02K 7/183

* cited by examiner

100

Z
X
Y

101

130

140

150

103

104

105

100

103 140 101

102

105

150

130

104

STATOR OF AN ELECTRIC GENERATOR HAVING A REINFORCEMENT STRUCTURE

CROSS-REFERENCE TO RELATED APPLICATIONS

This application claims priority to EP Application No. 21191230.8, having a filing date of Aug. 13, 2021, the entire contents of which are hereby incorporated by reference.

FIELD OF TECHNOLOGY

The following relates to a stator for a wind turbine generator having at least a reinforcement structure. Furthermore, the following relates to a method of reinforcing a stator for a wind turbine generator

BACKGROUND

An electric generator, such as an electric generator installed in a wind turbine, typically comprises a rotor which rotates relative to a stator.

The stator normally comprises a frame body extending along a longitudinal central axis and including a stator yoke. End plates may be provided at the axial ends, which are also called the drive end and the non-drive end, respectively. The drive end (DE) is the longitudinal end facing the driving device (i.e., the rotor with blades of the wind turbine) and is spaced apart from the non-drive end (NDE) in an axial direction. The end plates mechanically support the stator frame body during manufacturing and operation. However, in the context of growing demand for renewable energies, the size (i.e., the diameter of rotor and stator) keeps increasing.

Wind turbines should achieve the highest possible electrical output with the lowest possible weight and smallest possible dimensions of the generator housed in the tower head. However, ever growing demand for renewable energies, such as wind energy, requires increasingly large dimensions of the generator, and hence also of the stator of the generator.

Therefore, there is a need to provide a robust design for a large stator of an electric wind turbine generator having one or more end plates, which design permits larger stator sizes by providing the necessary mechanical support.

SUMMARY

An aspect relates to a stator of an electric generator, in particular for a stator of a wind turbine generator.

According to a first aspect of embodiments of the invention, there is provided a stator for a wind turbine generator, the stator comprising a first end plate and a second end plate spaced apart from each other in an axial direction of the wind turbine generator, and a reinforcement structure shaped as a plate and arranged between, and fixed to the first end plate and the second end plate, wherein the reinforcement structure is configured for coupling the first end plate and the second end plate, such that a force is transmissible between the first end plate and the second end plate.

According to a further aspect of embodiments of the invention, there is provided a method for reinforcing a stator of a wind turbine generator, the method comprising i) arranging a first end plate and a second end plate spaced apart from each other in an axial direction of the wind turbine generator, ii) arranging a reinforcement structure shaped as a plate between the first end plate and the second end plate, and iii) fixing the reinforcement structure to the first end plate and to the second end plate, wherein the reinforcement structure couples the first end plate and the second end plate, such that a force is transmissible between the first end plate and the second end plate.

In the context of the present document, the term "stator" may denote the immovable part of an electric generator, as has already been described above. A stator has an annular or cylindrical structure comprising for example magnetic elements and/or coil elements for generating electricity. Around the central axis, which corresponds to an axis of rotation of the driving device (i.e., the rotor), there is a (e.g., conical) hole in which there is sufficient room for the shaft and/or bearings of the rotor. The wind turbine generator may be designed with an external rotor rotating around an inner stator or an internal rotor being surrounded by the stator.

In the context of the present document, the term "axial direction" may denote a direction (substantially) parallel to the direction of the axis of rotation of the rotor of the turbine, in particular of the wind turbine. The axis of rotation, hence the axial direction, is substantially orthogonal to a plane in which the end plates of the stator lie.

In the context of the present document, the term "plate" may denote a flat, relatively thin piece of material, for example a forged, rolled, or cast metal in sheets of a certain thickness (other materials are possible). A plate, in the context of the present document, may have a main extension in two dimensions (or direction vectors) of a (geometric) plane, and the thickness along a third dimension, which is orthogonal to the plane, or, in other words, parallel to a normal vector that is orthogonal to the direction vectors of the plane. The main extension is usually much greater than the thickness. Although in its basic form, a plate may substantially have a rectangular shape with respect to the main extension, a plate in the context of this document may have various forms or shapes, such as an "X" shape, a triangular shape, a round shape, etc.

Embodiments of the invention may be based on the idea that a robust stator for large high performance electricity generators for wind turbines may be provided, when reinforcement structures shaped as a plate are coupled to the end plates of the stator, such that forces are transmissible between the end plates. Conventionally, the size (i.e., the diameter) of a stator is very limited due to unwanted vibrations and increased instability. It has now been found by the inventors that it may be surprisingly efficient to transmit forces between end plates of a stator instead of relying solely on the frame body for robustness and stability of the stator. When assembling a stator of a wind turbine generator, reinforcement structures may be arranged between, and fixed to the endplates of the stator. Thereby, overall robustness of the stator is immensely increased compared to conventional stators, because the lateral (or axial) stiffness is significantly increased. Due to the shape of the reinforcement structures being plate shaped, a proper weight/robustness relation is achieved since the thin plate shaped reinforcement structures have only a low weight on the one side and strongly increase the robustness on the other side.

EXEMPLARY EMBODIMENTS

In the following, exemplary embodiments of the component carrier will be described.

According to an embodiment of the invention, the plate has a thickness of 1 mm to 50 mm, in particular of 5 mm to 30 mm, further in particular of 8 mm to 12 mm. However, the thickness may vary according to specific requirements. A greater thickness has the advantage that the reinforcement structures may absorb and/or transmit greater forces from or between the end plates than respective thinner reinforcement structures (i.e., reinforcement structures with a lesser thickness). However, reinforcement structures having a lesser thickness may be lighter in weight and therefore contribute to lightweight construction of a stator of a wind turbine generator.

According to a further embodiment of the invention, the reinforcement structure has a first end section, which is fixed to the first end plate, and which has a first extension length along a first connection joint between the reinforcement structure and the first end plate. The reinforcement structure further has a second end section, which is fixed to the second end plate, and which has a second extension length along a second connection joint between the reinforcement structure and the second end plate. Furthermore, the reinforcement structure has a central section formed between the first end section and the second end section and having a maximum extension length smaller than at least one of the first minimum extension length and the second extension length. The connection joint defines the contact faces between the reinforcement structure and a respective end plate. The connection joint may be formed by a contact edge of the plate shaped reinforcement structure abutting onto a surface of the respective end plate to be fixed on. The respective extension length may have a maximum at the contact edge.

According to another embodiment of the invention, the first end section tapers from the first connection joint towards the central section with respect to the first extension length (i.e., along the axial direction), and the second end section tapers from the second connection joint towards the central section with respect to the second extension length (i.e., along the axial direction). In other words, the parts (or sections) of the reinforcement structures, that are connected to, and directly in contact with the end plates at the respective connection joints, have substantially larger dimensions than the central section of the reinforcement structures. This has the effect that forces are efficiently transmitted and that lateral stiffness and robustness against deformation or vibration is ensured. This may be comparable to beads in thin-walled components like the sheet metal of a car body.

In other embodiments, the central section has a constant maximum extension length (i.e., along the axial direction). Descriptively speaking, the reinforcement structure is substantially shaped like an "X".

In yet another embodiment of the invention, the first end plate comprises a first venting hole. In another embodiment, also the second end plate may comprise a second venting hole. The first venting hole (and, if provided, also the second venting hole) is configured for enabling an air flow in an axial direction through the first venting hole. Heat, which may be generated during operation of the due to the rotation of the rotor and due to the generated electricity, may be conveyed by the air flow. Providing venting holes may have the advantages that an air flow may be enabled, such that hot air is transported away (i.e., out of the interior of the stator) and cooler air may flow into the stator. Venting holes may have a substantially round shape, but may also be, for example, elongated holes or slots.

According to a further embodiment, there is further comprised at least one separation element arranged between and fixed to the first end plate and the second end plate and coupled to the reinforcement structure, in particular by bolts and/or by welding, wherein the separation element is configured for forming a first compartment forming an air channel through the first venting hole of the first end plate. Providing a separation element also has the effect that forces may also be transmitted between the first end plate and/or the second end plate and/or two reinforcement structures and thus lateral stiffness and overall robustness of the stator is even further increased.

According to a further embodiment of the invention, the separation element is further configured for forming a second compartment forming a further air channel between the first end plate and the second end plate, wherein the further air channel is separated from the air channel by the separation element. Forming a compartment for forming an air channel has the technical effect that an efficient air flow may be established through the first venting hole and, if provided, through the second venting hole. Furthermore, by creating a first compartment and a second compartment, it may be possible to have two different air flows within the same section of the stator. For example, there may be enabled a cooling air flow in the first compartment in an axial direction from the first end plate towards the second end plate, and a hot air flow in the second compartment in an axial direction from the second end plate towards the first end plate, or vice versa. This may contribute to efficiently venting and/or cooling the stator during operation.

According to a further embodiment of the invention, the separation element is shaped as a flat plate, which lies on a plane substantially orthogonal to a plane of one of the first end plate and the second end plate, or which lies on a plane angled with respect to a plane of one of the first end plate and the second end plate. In other words, the separation element is arranged between the first end plate and the second end plate in such a manner, that a radial distance to a central axis of rotation of the stator along the central axis of rotation is constant, or wherein the separation element is arranged between the first end plate and the second end plate in such a manner that a radial distance to a central axis of rotation of the stator changes along the central axis of rotation. When the separation element is shaped as a flat plate, descriptively speaking, a plurality of separation elements may describe, in a cross-sectional view, a polygon. In another embodiment, the separation element is shaped as a curved plate resembling a segment of a concentric circle around the central axis of rotation. In that case, descriptively speaking, a plurality of separation elements may describe, in a cross-sectional view, a circle.

According to a further embodiment of the invention, the reinforcement structure is fixed to the first end plate and to the second end plate, in particular by bolts and/or by welding. Both bolts and welding offer a reliable and strong connection between the reinforcement structure and the end plates, which in turn ensures an optimal transmission of force and longevity of the stator.

According to a further embodiment of the invention, the stator comprises a diameter of 5 m to m (meters), in particular of 8 m to 12 m (meters). In yet another embodiment, the reinforcement structure comprises a lightweight material, in particular aluminium or a carbon fibre reinforced polymer. However, other materials, such as steel or similar alloys are possible. Using lightweight materials contributes to keeping the overall weight of the generator low. However, using materials such as steel may contribute to even further increased stiffness. Therefore, the materials used may depend on the size of the stator and to the accordingly needed stiffness. Furthermore, materials may be chosen in accordance with an operational environment. For example, for offshore wind turbines, a material may be chosen which is less prone to corrosion, such as a (fibre reinforced) polymer.

According to a further embodiment of the invention, the stator comprises a plurality of reinforcement structures, in particular at least 4, further in particular at least 8 reinforcement structures, wherein the reinforcement structures of the plurality of reinforcement structures are arranged radially in a circumferential direction, in particular equiangularly, around a central axis of rotation of the stator. Descriptively speaking, the reinforcement structures are arranged around the central axis of rotation of the stator, with equal angles between each other, like the cylinders of a radial engine.

According to a further embodiment of the invention, the stator further comprises at least one blower device arranged between two reinforcement structures and configured for creating an air flow, in particular a cooling air flow. In some cases, wind turbine generators may create a large amount of heat, which may not be sufficiently dissipated by providing venting holes only.

Therefore, providing a blower device has the technical effect that heat accumulation within the stator and related damage to parts of the generator can be effectively prevented, because a strong enough air flow is created by the blower devices, such that hot air is blown out of the interior of the stator. The blower device may also blow air from the first compartment to the second compartment, or vice versa. In further embodiments, the blower device may comprise a cooling unit for generating cooling air, which may actively cool down the interior of the stator.

According to yet a further embodiment of the invention the blower device is mounted to the separation element for creating the air flow in at least one of the first compartment and the second compartment. Descriptively speaking, the blower device may be mounted to, or hung onto a separation element like a pod, such that it is arranged in one of the first compartment and the second compartment.

According to a further aspect of the present invention, there is described a method of using a stator of a wind turbine generator, in particular a stator with a diameter greater than 8 m, wherein the stator comprises any of the features described above.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless indicated otherwise, in addition to any combination of features belonging to one type of subject matter also any combination between features relating to different subject matters, in particular between features of the method type claims and features of the apparatus type claims, is considered disclosed with this document.

The aspects defined above, and further aspects of the present invention are apparent from the examples of embodiments to be described hereinafter and are explained with reference to the examples of embodiments. The embodiments will be described in more detail hereinafter with reference to examples of embodiments, to which the invention is, however, not limited.

BRIEF DESCRIPTION

Some of the embodiments will be described in detail, with reference to the following figures, wherein like designations denote like members, wherein.

DETAILED DESCRIPTION

In order to avoid unnecessary repetitions elements or features, which have already been elucidated with respect to a previously described embodiment are not elucidated again at a later position of the description.

Furthermore, spatially relative terms, such as "front" and "back", "above" and "below", "left" and "right", et cetera are used to describe an element's relationship to another element(s) as illustrated in the figures. Thus, the spatially relative terms may apply to orientations in use which differ from the orientation depicted in the figures. Obviously, all such spatially relative terms refer to the orientation shown in the figures only for ease of description and are not necessarily limiting, as an apparatus according to an embodiment of the invention can assume orientations different than those illustrated in the figures when in use.

Figure 1:
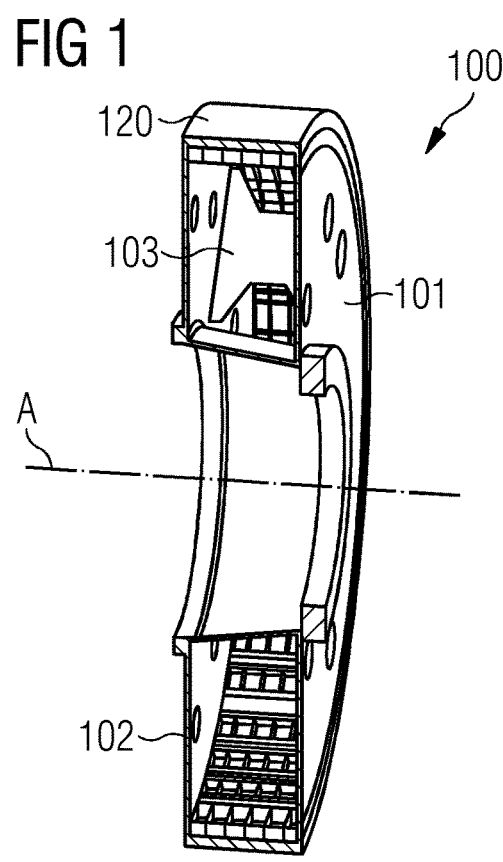
FIG. 1 shows a three-dimensional drawing of a stator, according to an exemplary embodiment of the invention.
Figure 2:
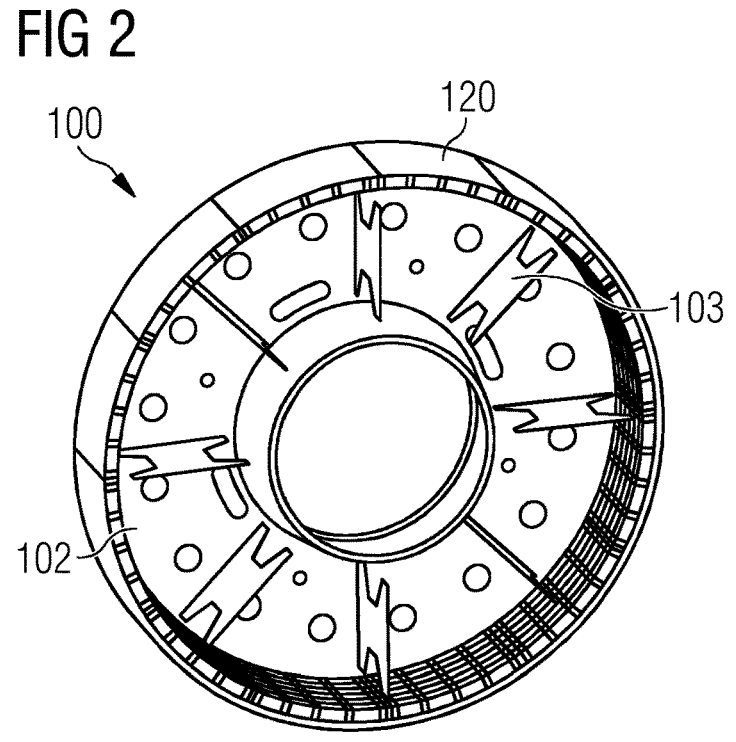
FIG. 2 shows another three-dimensional drawing of a stator, according to an exemplary embodiment of the invention.

FIG. 1 shows a three-dimensional view of a stator 100, according to an exemplary embodiment of the invention. FIG. 2 shows another three-dimensional view of a stator 100, according to an exemplary embodiment of the invention, as viewed in an axial direction. Essentially, the same elements are shown as in FIG. 1. The Stator 100 may comprise a large diameter of, for example, 11 m or more. The stator 100 for a wind turbine generator comprises a frame body 120, a first end plate 101 and a second end plate 102, spaced apart from each other in an axial direction X (parallel to a central axis of rotation A) of the wind turbine generator, and a reinforcement structure 103 shaped as a plate and arranged between, and fixed to the first end plate 101 and the Second end plate 102. The reinforcement structure 103 is configured for coupling the first end plate 101 and the second end plate 102, such that a force is transmissible between the first end plate 101 and the second end plate 102. The hole around the axis of rotation A is shaped conically. The stator 100 may be surrounded by a rotatable external rotor for forming a generator for a wind turbine.

Figure 3:
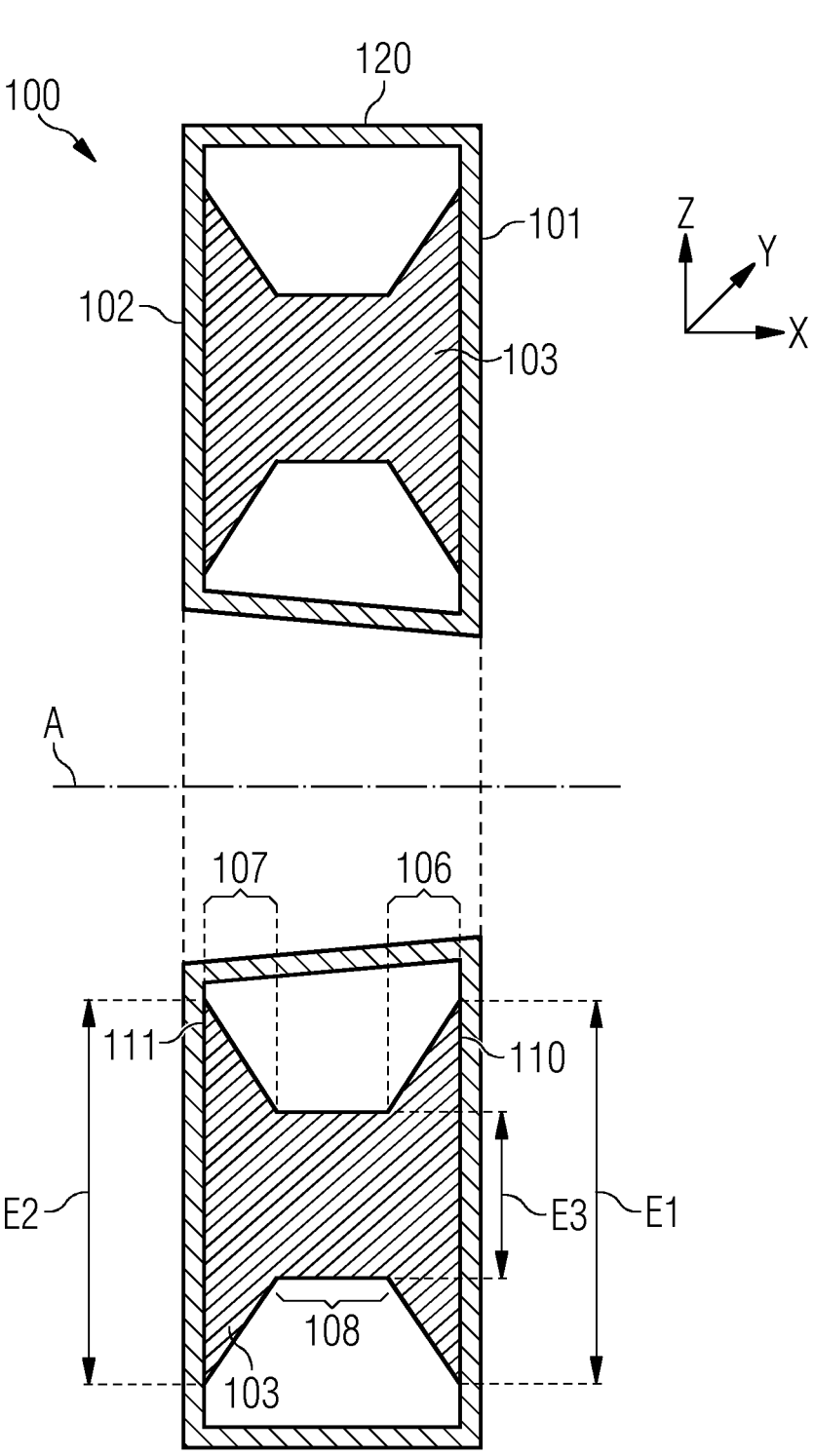
FIG. 3 illustrates a cross-sectional view of a stator, according to an exemplary embodiment of the invention.
Figure 4:
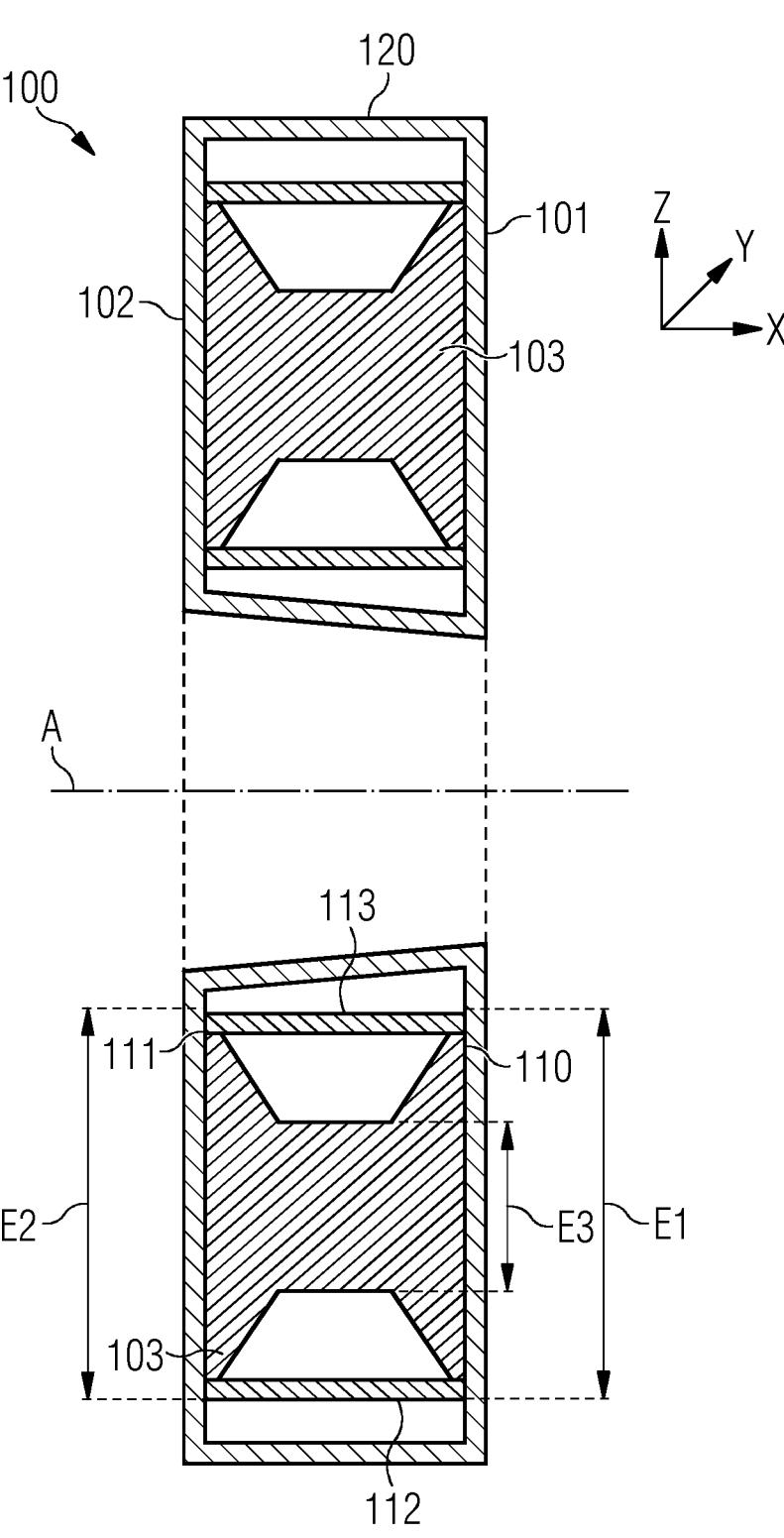
FIG. 4 illustrates a cross-sectional view of a stator, according to an exemplary embodiment of the invention.
Figure 5:
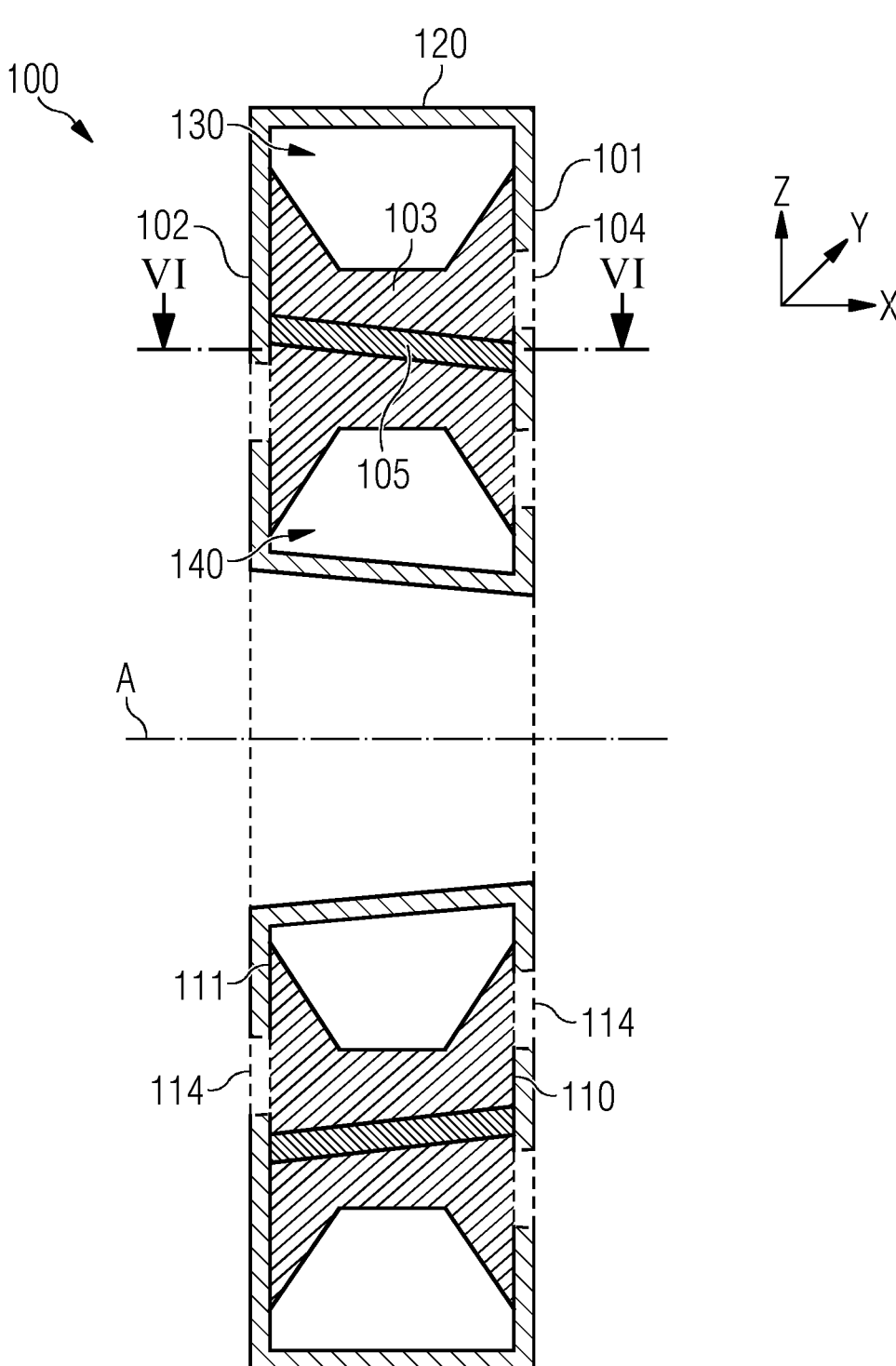
FIG. 5 illustrates a cross-sectional view of a stator, according to an exemplary embodiment of the invention.

FIG. 3, FIG. 4, and FIG. 5 illustrate cross-sectional views of a stator 100, according to exemplary embodiments of the invention. In detail, in FIG. 3, there can be seen a reinforcement structure 103 having a first end section 106, which is fixed to the first end plate 101, and having a first extension length E1 along a first connection joint 110 between the reinforcement structure 103 and the first end plate 101. The reinforcement structure 103 further has a second end section 107, which is fixed to the second end plate 102 and which has a second extension length E2 along a second connection joint 111 between the reinforcement structure 103 and the second end plate 102. Furthermore, there is shown a central section 108 formed between the first end section 106 and the second end section 107 and having a maximum extension length E3. As can be seen clearly, the maximum extension length E3 is smaller than the first minimum extension length E1 and the second extension length E2. In particular, the first end section 106 tapers from the first connection joint 110 towards the central section 108 with respect to the first extension length E1, and the second end section 107 tapers from the second connection joint 111 towards the central section 108 with respect to the second extension length E2.

Furthermore, as shown in FIG. 3 to FIG. 5, the central section 108 has a constant maximum extension length E3. Therefore, the reinforcement structure 103 could be in other words described as substantially having the shape of an "X". In some embodiments, which are not shown, the reinforcement structure 103 may comprise a very small central section 108 (with respect to the dimensions of the first end section 106 and the second end section 107) or may not comprise a central section 108 at all, which would emphasize the shape of an "X" even more, and which could be preferred in some cases. The X-shape, as described herein, takes advantage of physics and promotes the transmission of forces between the first end plate 101 and the second end plate 102, such that lateral stiffness and robustness against deformation or vibration is ensured. The first extension length E1 and/or the second extension length E2 may each have twice the length (or more) in comparison to the maximum extension length E3.

As can be taken from FIG. 4, in addition to the reinforcement structure 103, the stator may in some embodiments further comprise a reinforcement beam 112, and/or a further reinforcement beam 113, wherein the reinforcement beam 112 and the further reinforcement beam 113 are arranged between and fixed to the first end plate 101 and the second end plate 102 and adjacent to the reinforcement structure 103. The reinforcement beam 112 and the further reinforcement beam 113 further promote lateral stiffness and overall robustness of the stator 100 and may be configured such that a force is transmissible between the first end plate 101 and the second end plate 102. In an embodiment, the reinforcement beam 112 and the further reinforcement beam 113 are arranged on opposite radial sides of a respective reinforcement structure 103. The stator may comprise a plurality of reinforcement beams 112 and/or a plurality of further reinforcement beams 113.

Now referring to FIG. 5, there is shown an embodiment of the invention similar to the ones described above. However, in this case, the stator further comprises a first venting hole 104 in the first end plate 101. In some embodiments, there may also be provided a second venting hole 109 in the second end plate 102. The first venting hole 104 (and, if provided, the second venting hole 109) is configured for enabling an air flow in an axial direction X. There is further shown a separation element 105, arranged between and fixed to the first end plate 101 and the second end plate 102. The separation element 105 forms a first compartment 130 forming an air channel through the first venting hole 104 of the first end plate 101. The separation element 105 further forms a second compartment 140 forming a further air channel between the first end plate 101 and the second end plate 102, wherein the further air channel is separated from the air channel (formed by the first compartment 130) by the separation element 105. Further venting holes 114 are provided in the first end plate 101 and in the second end plate 102 as shown in FIG. 5.

As can further be taken from FIG. 5, the separation element 105 is shaped as a flat plate, which lies on a plane angled with respect to a plane of one of the first end plate 101 and the second end plate 102. In other words, the separation element 105 is arranged between the first end plate 101 and the second end plate 102 in such a manner, that a radial distance to a central axis of rotation A of the stator 100 changes along the central axis of rotation A (i.e., in an axial direction X). Or, in yet other words, in the cross-sectional view, the separation element 105 is angled with respect to an imaginary line which is parallel to the central axis of rotation A.

Figure 6:
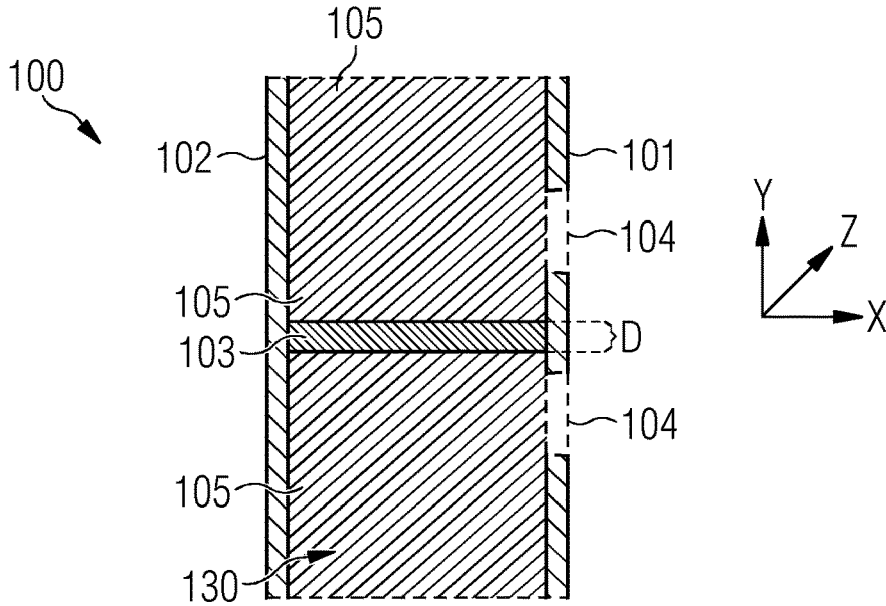
FIG. 6 shows a sectional view of section A-A of FIG. 5 of a stator, according to an exemplary embodiment of the invention.

FIG. 6 shows a sectional view of section A-A of FIG. 5 of a stator 100, according to a further exemplary embodiment of the invention. As can be seen, there are two separations elements 105, one arranged at each lateral side (referring to a direction Y) of the reinforcement 103. Furthermore, the reinforcement structure has a thickness D, which may for example be in a range from 1 mm to 50 mm.

Figure 7:
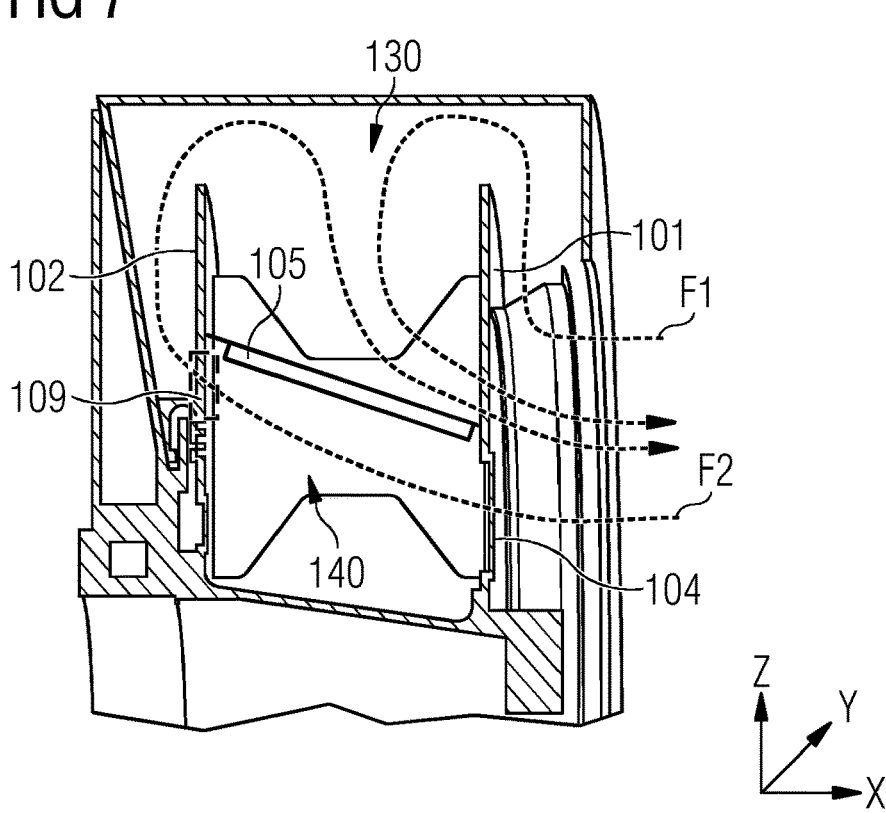
FIG. 7 shows a cross-sectional view of a part of a stator comprising two compartments, according to an embodiment of the invention.

FIG. 7 shows a detailed cross-sectional view of a part of a stator 100 comprising a first compartment 130 and second compartment 140, according to an embodiment of the invention. FIG. 7 illustrates well that an air flow F1 and a further air flow F2 are separate air flows, separated by the separation element 105. However, in order to provide efficient cooling and ventilation, the first air flow F1 and the second air flow F2 may both circulated between an interior and an exterior of the stator 100, in particular between the first compartment 130 and the second compartment 140 and vice versa.

Figures 8, 9:
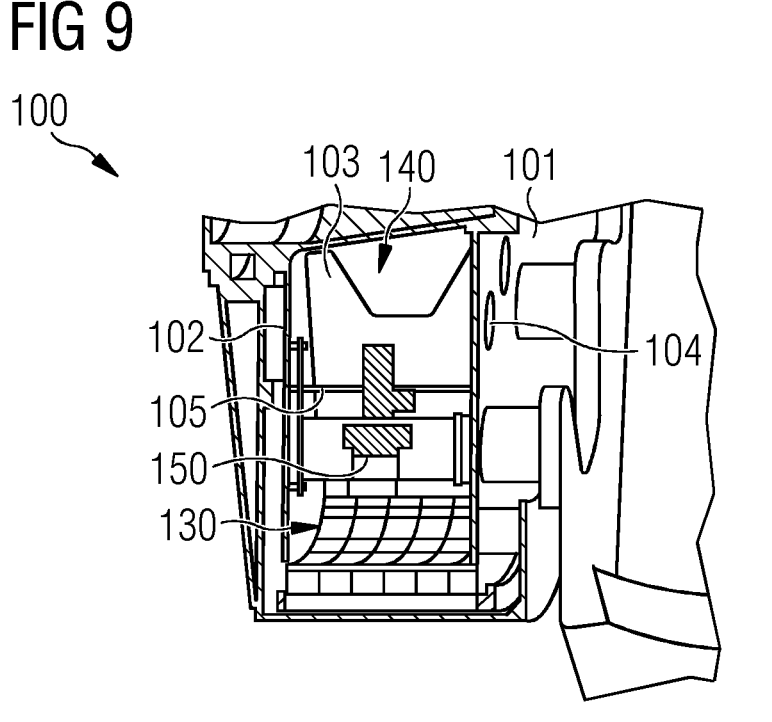
FIG. 8 shows a sliced-open illustration of a stator comprising blower devices, according to exemplary embodiments of the invention.
FIG. 9 shows a detail of a three-dimensional drawing of a part of a stator according to an exemplary embodiment of the invention.

FIG. 8 shows a sliced-open illustration of a stator 100 comprising blower devices 150, according to exemplary embodiments of the invention. FIG. 9 shows a detail of the embodiment described with respect to FIG. 8. The stator 100 comprises a plurality of reinforcement structures 103, namely 8 reinforcement structures 103, which are arranged radially and equiangularly in a circumferential direction, around the central axis of rotation A of the stator 100. Descriptively speaking, the reinforcement structures 103 are arranged around the central axis of rotation A of the stator 100 with equal angles between each other, like the cylinders of a radial engine. The blower devices 150 are arranged between two reinforcement structures 103 each and configured for creating an air flow F1, in particular a cooling air flow F1.

Like the plurality of reinforcement structures 103 shown in FIG. 6, also the blower devices 150 are arranged radially and equiangularly in a circumferential direction, around the central axis of rotation A of the stator 100. Furthermore, the blower devices 150 are each mounted to a respective separation element 105 like a pod, such that they are arranged in respective first compartments 130 formed by respective separation elements 105.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A stator for a wind turbine generator, the stator comprising:

a first end plate and a second end plate spaced apart from each other in an axial direction of the wind turbine generator; and a reinforcement structure shaped as a plate and arranged between, and fixed to the first end plate and the second end plate; and a separation element arranged between and fixed to the first end plate and the second end plate and coupled to the reinforcement structure, wherein the separation element extends from the first end plate to the second end plate wherein the reinforcement structure is configured for coupling the first end plate and the second end plate, such that a force is transmissible between the first end plate and the second end plate, wherein the reinforcement structure comprises:

a first end section, which is fixed to the first end plate, and which has a first extension length along a first connection joint between the reinforcement structure and the first end plate;

a second end section, which is fixed to the second end plate, and which has a second extension length along a second connection joint between the reinforcement structure and the second end plate; and a central section formed between the first end section and the second end section and having a maximum extension length smaller than at least one of the first minimum extension length and the second extension length;

wherein the reinforcement structure comprises a single continuous plate forming the first end section, the central section, and the second end section.

2. The stator according to claim 1, wherein the plate has a thickness of 1 mm to 50 mm.

3. The stator according to claim 1, wherein the first end section tapers from the first connection joint towards the central section with respect to the first extension length, and wherein the second end section tapers from the second connection joint towards the central section with respect to the second extension length.

4. The stator according to claim 3, wherein the central section has a constant maximum extension length.

5. The stator according to claim 1, wherein the first end plate comprises a venting hole, the venting hole configured for enabling an air flow in an axial direction through the venting hole.

6. The stator according to claim 5, wherein the separation element is configured for forming a first compartment forming an air channel through the venting hole of the first end plate.

7. The stator according to claim 6, wherein the separation element is further configured for forming a second compartment forming a further air channel between the first end plate and the second end plate, wherein the further air channel is separated from the air channel by the separation element.

8. The stator according to claim 5, wherein the separation element is shaped as a flat plate, which lies on a plane substantially orthogonal to a plane of one of the first end plate and the second end plate, or which lies on a plane angled with respect to a plane of one of the first end plate and the second end plate; or wherein the separation element is shaped as a curved plate resembling a segment of a concentric circle around a central axis of rotation.

9. The stator according to claim 8, wherein the reinforcement structure is fixed to the first end plate and to the second end plate.

10. The stator according to claim 1, comprising at least one of the following features:

wherein the stator comprises a diameter of 5 m to 20 m;

wherein the reinforcement structure comprises a lightweight material.

11. The stator according to claim 1, wherein the stator comprises a plurality of reinforcement structures, wherein the reinforcement structures of the plurality of reinforcement structures are arranged radially in a circumferential direction around the central axis of rotation of the stator.

12. The stator according to claim 10, further comprising at least one blower device arranged between two reinforcement structures and configured for creating a cooling air flow.

13. The stator according to claim 12, wherein the blower device is mounted to the separation element for creating the cooling air flow in at least one of the first compartment and the second compartment.

14. A method for reinforcing a stator of a wind turbine generator, the method comprising:

arranging a first end plate and a second end plate spaced apart from each other in an axial direction of the wind turbine generator;

arranging a reinforcement structure shaped as a plate between the first end plate and the second end plate; and fixing the reinforcement structure to the first end plate and to the second end plate, wherein a separation element is arranged between and fixed to the first end plate and the second end plate and coupled to the reinforcement structure, wherein the separation element extends from the first end plate to the second end plate;

wherein the reinforcement structure couples the first end plate and the second end plate, such that a force is transmissible between the first end plate and the second end plate;

wherein the reinforcement structure comprises:

a first end section, which is fixed to the first end plate, and which has a first extension length along a first connection joint between the reinforcement structure and the first end plate;

a second end section, which is fixed to the second end plate, and which has a second extension length along a second connection joint between the reinforcement structure and the second end plate; and a central section formed between the first end section and the second end section and having a maximum extension length smaller than at least one of the first minimum extension length and the second extension length;

wherein the reinforcement structure comprises a single continuous plate forming the first end section, the central section, and the second end section.

* * * * *